US011622045B2

(12) United States Patent
Caseau et al.

(10) Patent No.: US 11,622,045 B2
(45) Date of Patent: Apr. 4, 2023

(54) METHOD AND DEVICE FOR REDIRECTING A COMMUNICATION REQUEST

(71) Applicant: ORANGE, Issy-les-Moulineaux (FR)

(72) Inventors: François Caseau, Chatillon (FR); Fabien Binard, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/038,622

(22) Filed: Sep. 30, 2020

(65) Prior Publication Data

US 2021/0099578 A1 Apr. 1, 2021

(30) Foreign Application Priority Data

Oct. 1, 2019 (FR) ...................................... 1910869

(51) Int. Cl.
*H04M 3/54* (2006.01)
*H04W 4/16* (2009.01)
*H04M 3/42* (2006.01)

(52) U.S. Cl.
CPC ....... *H04M 3/543* (2013.01); *H04M 3/42059* (2013.01); *H04W 4/16* (2013.01)

(58) Field of Classification Search
CPC ............. H04M 3/543; H04M 3/42059; H04M 3/42263; H04M 3/54; H04M 3/436; H04M 1/663; H04W 4/16
See application file for complete search history.

(56) References Cited

U.S. PATENT DOCUMENTS

| | | | | |
|---|---|---|---|---|
| 9,277,049 | B1 * | 3/2016 | Danis | H04M 3/54 |
| 9,332,119 | B1 * | 5/2016 | Danis | H04M 3/436 |
| 10,652,390 | B2 * | 5/2020 | Cohen | H04M 1/663 |
| 2018/0302513 | A1 * | 10/2018 | Cohen | H04M 1/663 |
| 2019/0158663 | A1 * | 5/2019 | Dowlatkhah | H04W 8/18 |
| 2020/0213443 | A1 * | 7/2020 | Synal | H04M 3/465 |
| 2020/0366787 | A1 * | 11/2020 | Sharpe | H04M 15/56 |

FOREIGN PATENT DOCUMENTS

CN 109348036 A 2/2019

OTHER PUBLICATIONS

English translation of the French Search Report and Written Opinion dated Apr. 8, 2020 for corresponding French Application No. 1910869, filed on Oct. 1, 2019.

* cited by examiner

*Primary Examiner* — Minjung Kim
(74) *Attorney, Agent, or Firm* — David D. Brush; Westman, Champlin & Koehler, P.A.

(57) ABSTRACT

A method for redirecting a communication request sent by a caller terminal to a called terminal, an identifier of the caller terminal being absent from a list of identifiers of caller terminals for which the establishment of a communication with the called terminal is authorized or blocked, referred to as a white list or black list, respectively. The method includes: redirecting the communication request to a redirection terminal associated with the called terminal, distinct from the called terminal; receiving an instruction message, including the identifier of the caller terminal and an instruction relating to the white list or to the black list, depending on the instruction received, adding the identifier of the caller terminal to the white list or to the black list.

9 Claims, 4 Drawing Sheets

METHOD AND DEVICE FOR REDIRECTING A COMMUNICATION REQUEST

1. FIELD OF THE INVENTION

The field of the invention is that of person-to-person communications.

2. PRIOR ART

With IP-based telephony, the cost per call has become minimal or zero for the caller, apart from the network access cost that they have to pay, for example in the form of a subscription or time-limited plan.

One particularly negative consequence of the lack of actual cost for a call is the proliferation of unsolicited calls received by users on their personal communication terminal.

There are known solutions for dealing with this issue. For example, a list is consulted by the called terminal, or by an equipment of the network to which the called terminal is connected, to determine whether the caller is authorized or unauthorized to establish communications with the called party. The term "black list" is used to refer to a list which contains identifiers of unauthorized callers, and "white list" to refer to a list which contains identifiers of authorized callers.

One problem with black lists is that it is very easy for a caller to modify their identifiers and escape a black list.

One problem with white lists is that a called party has to provide, in advance, the identifiers of all of the contact partners who they wish to authorize. Some white list-based systems provide an interface for managing the list, for example a web interface, or a voice interface via an interactive voice server, allowing a user to add and remove identifiers to and from the white list. Still, managing a white list remains a complicated operation, particularly for an elderly person, who are especially vulnerable to cold calling. An aim of the invention is to overcome these drawbacks of the prior art.

3. DISCLOSURE OF THE INVENTION

The invention improves the situation using a method for redirecting a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the method comprising:
  redirecting the communication request to a user terminal, distinct from the called terminal, referred to as the redirection terminal,
  receiving an instruction message, comprising the identifier of the caller terminal and an instruction relating to the white list or to the black list,
  depending on the instruction received, adding the identifier of the caller terminal to the white list or to the black list.

According to the invention, rather than being established on the called terminal, all communication requests, or calls, from a caller terminal unknown to the called terminal are processed by a network equipment or by a software application installed on the called terminal, commonly called a mobile application. In both cases, regardless of whether the processing is carried out by an equipment distinct from the mobile terminal or by a mobile application integrated with same, the term "platform" will be used hereinafter to refer to the equipment or the mobile application. A distinct equipment is for example the the AliasNumber service platform from Orange, with which the user of the called terminal has to register their terminal beforehand.

In a white list or black list-based system, the processing of a call from a number absent from these lists is not envisaged. It will be rejected, accepted or redirected to a voice server. To be added to the white list or to the black list, the number must be known beforehand by the person who manages the lists, who is for example the user of the called number, or a third party appointed by them. Consequently, a contact partner who is legitimately known to the called party, if they are calling from a new number for the first time, will not be authorized and will have to find an alternative means, outside the communication system used, to contact the called party so that they add their new number to the white list. The call from a new number is therefore not established, but by virtue of the proposed method, this number may be added to the white list without any particular action on the part of the caller and without having to use a communication system other than that used by the method. Specifically, the method, after having intercepted the call, notifies a person, who may or may not be the called person, using a redirection terminal which is not the called terminal. The person using the redirection terminal may then decide to initiate the addition of the number to the white list. Correspondingly, in the case of a call that is unwanted by the called party, the proposed method allows the caller number to be added to a black list, without any particular action on the part of the called terminal.

According to one aspect of the redirection method, the instruction message is received from the redirection terminal.

This is the simplest case, in which the redirection terminal is used both to receive the call and then to notify the platform. The identifier of this terminal must of course be previously communicated to the system by the user of the called terminal. This user may for example prefer to manage the white/black list of their landline telephone terminal using their cellular terminal (in other words, their smartphone) which has a more ergonomic interface.

According to one aspect of the redirection method, the redirection terminal is selected from a group of redirection terminals according to predetermined criteria.

Thus, notification messages relating to calls from unknown terminals may be sent to different terminals according to criteria such as the time of day, the day of the month, or else the type of identifier of the caller terminal.

For example, if the called terminal is a fixed terminal, these notification messages may be sent to this terminal when its user is at home (evenings and at the weekend), and to a mobile terminal of the user when they are out (during work hours).

As another example, the notification messages may be sent by default to the terminal of the called party themself, except if the caller number indicates that the call is from abroad, in which case the notification message may be sent to the associated terminal of a third party, preselected because they speak a foreign language.

According to one aspect, the redirection method comprises a prior step of obtaining an identifier of the redirection terminal.

Thus, the user of the called terminal may themself indicate to which terminal the system should send the notification messages relating to calls from unknown terminals. Advantageously, they may therefore also revoke, at any time, an authorization previously given to a third party by indicating the number of the terminal of another third party, or the number of one of their own terminals.

According to one aspect of the redirection method, the redirection terminal is the terminal of a third party authorized by the user of the called terminal.

Thus, it is not the user of the called terminal themself who is disturbed by the notification messages, and who has to decide whether or not to add the identifier of the caller terminals to the white/black list. Specifically, certain users, for example elderly people, do not want to or cannot manage the white/black list and their user interface themselves. By virtue of this aspect, the user of the called terminal may authorize a trusted person to do it in their stead. All that is necessary is for the identifier of the terminal of this third party to be given beforehand to the system by the called person.

The various aspects of the redirection method that have just been described are able to be implemented independently of one another or in combination with one another.

According to one aspect of a second embodiment of the redirection method, the redirection terminal is not a user terminal but is a voice server, and the method further comprises, following the redirection and prior to receiving the instruction message, the sending of a notification message to another terminal associated with the called terminal, referred to as the associated terminal, distinct both from the called terminal and from the redirection terminal, the notification message comprising at least one item of information relating to the redirection. In this aspect, the received instruction message is sent by the associated terminal.

Thus, the user of the associated terminal, who may or may not be the same as that of the called terminal, knows that a call for the called terminal and from an unknown terminal has been redirected to the voice server. By virtue of the notification message received on their associated terminal, they may then consult this voice server, i.e. listen to a voice message or read a text message possibly left by the caller, or be informed of any other information that the voice server has collected on the caller or on the caller terminal, if for example the voice server is interactive. In one variant, the notification message may even initiate a direct connection between the associated terminal and the voice server. Using a voice server as the redirection terminal has multiple advantages. For example, the communication request from the calling contact partner does not go completely without response for them. Additionally, by virtue of the voice server, the calling contact partner may be informed that they are not known and are not authorized to call the requested terminal, and/or informed of the one or more solutions which exist so that they are authorized to do so. Alternatively, they may just be prompted to leave a message, with no further explanation.

According to one aspect of the second embodiment of the redirection method, the notification message comprises at least one item of information obtained by the voice server.

Thus, not only is the user of the associated terminal notified of the occurrence of a call from an unknown terminal, but the notification message is enriched with an item of information allowing them to decide immediately whether or not to make an addition to the white/black list. The user of the associated terminal may therefore avoid consulting the voice server in order to make their decision, which saves them time. Their decision is then transposed into the instruction message sent by the associated terminal and received by the system. It is understood that making an addition to the white/black list may be very fast, hardly any time after the initial communication request from the caller terminal.

According to one aspect of the second embodiment of the redirection method, the associated terminal is the terminal of a third party authorized by the user of the called terminal.

Thus, it is not the user of the called terminal themself who is disturbed, and who decides whether or not to add the identifier of the caller terminal to the white/black list. Specifically, certain users, for example elderly people, do not want to or cannot manage the white list and their user interface themselves. By virtue of this aspect, the user of the called terminal may authorize a trusted person to do it in their stead. All that is necessary is for the identifier of the terminal of this third party to be given beforehand to the system by the called person.

According to one aspect of the second embodiment of the redirection method, the associated terminal is selected from a group of associated terminals according to predetermined criteria.

Thus, the notification messages relating to a call from an unknown terminal may be sent to different terminals according to criteria such as the time of day, the day of the month, or else the type of identifier of the caller terminal.

For example, if the called terminal is a fixed terminal, the notification messages may be sent to this terminal when its user is at home (evenings and at the weekend), and to a mobile terminal of the user when they are out (during work hours).

As another example, the notification messages may be sent by default to the terminal of the called party themself, except if the caller number indicates that the call is from abroad, in which case the notification message may be sent to the associated terminal of a third party, preselected because they speak a foreign language.

According to one aspect of the second embodiment, the redirection method comprises a prior step of receiving an identifier of the associated terminal.

Thus, the user of the called terminal may themself indicate to which terminal the system should send the notification message relating to a call from an unknown terminal.

Advantageously, they may therefore also revoke, at any time, an authorization previously given to a third party by indicating the number of the terminal of another third party, or the number of one of their own terminals.

The various aspects of the second embodiment of the redirection method that have just been described are able to be implemented independently of one another or in combination with one another.

According to another aspect, the redirection method comprises the sending, to the caller terminal, of a notification relating to the addition, to the white list or to the black list, of the identifier of the caller terminal.

Thus, the calling contact partner will be certain that their next call to the called terminal will be either established or rejected without the called party having to contact the caller to inform them thereof. In the white list case, the caller therefore does not need to contact the called party by an alternative means in order to know from when they will be allowed to call them from their new number.

The invention also targets a method for qualifying a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the method comprising:

establishing the communication request between the caller terminal and a user terminal, distinct from the called terminal, referred to as the redirection terminal, after redirecting the request to the redirection terminal, sending an instruction message comprising the identifier of the caller terminal and an instruction relating to the white list or to the black list.

Thus, it is not the user of the called terminal who takes the decision to qualify a call from a user whom they do not know, i.e. to authorize or unauthorize future calls from the caller to the called party. It is the user of the redirection terminal, who may for example be a trusted third party, who carries out this qualification. This is very useful for example when the called person is a vulnerable person, due to age or due to disability.

According to one aspect, the method for qualifying a communication request further comprises obtaining an identifier of the called terminal.

Thus, the user of the redirection terminal does not need to manually specify in the instruction message for which terminal the white or black lists apply.

The invention also relates to a device for redirecting a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the device comprising a receiver, a transmitter, a processor and a memory coupled to the processor with instructions intended to be executed by the processor for:

redirecting the communication request to a terminal associated with the called terminal, distinct from the called terminal, referred to as the redirection terminal, receiving an instruction message, comprising the identifier of the caller terminal and an instruction relating to the white list or to the black list, depending on the instruction received, adding the identifier of the caller terminal to the white list or to the black list.

This device, which is capable of implementing, in all of its embodiments, the redirection method described above, may be implemented in a mobile application installed on the called terminal, or in a distinct equipment such as a platform for managing secondary identifiers, such as for example the AliasNumber platform from Orange.

The invention also relates to a device for qualifying a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the device comprising a receiver, a transmitter, a processor and a memory coupled to the processor with instructions intended to be executed by the processor for:

establishing the communication request between the caller terminal and a user terminal, distinct from the called terminal, referred to as the redirection terminal, after redirecting the request to the redirection terminal, sending an instruction message comprising the identifier of the caller terminal and an instruction relating to the white list or to the black list.

This device, which is capable of implementing, in all of its embodiments, the redirection method described above, may be implemented in a mobile application installed on the redirection terminal.

The invention also relates to a platform for managing secondary identifiers, capable of being connected to a telephone communication network, configured to manage a communication in said communication network initiated between a caller terminal and a called terminal, said called terminal being identified by a primary identifier and associated with a secondary identifier distinct from the primary identifier and corresponding to a redirection terminal distinct from the called terminal, the platform establishing said communication with the redirection terminal by presenting the caller terminal with the primary identifier of the called terminal without presenting the secondary identifier, said platform being characterized in that it further comprises a device for redirecting a communication request such as that described above.

In the case of an unwanted call in the first embodiment of the invention, there is thus no risk of the caller terminal retrieving, for unauthorized future use, a user identifier of the redirection terminal with which the call is established.

The invention also relates to computer programs comprising instructions which, when these instructions are executed by a processor, result in it implementing the steps of the method for redirecting a communication request, or the method for qualifying a communication request, as have been described above.

The invention also targets information media that are readable by computer including instructions of a computer program as mentioned above.

The term "computer" comprises any machine comprising one or more processors, such as for example a smartphone or a computer server.

The programs mentioned above may use any programming language, and be in the form of source code, object code, or of intermediate code between source code and object code, such as in a partially compiled form, or in any other desirable form.

The information media mentioned above may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to the invention may in particular be downloaded from an Internet network.

Alternatively, the information medium may be an integrated circuit in which the program is incorporated, the circuit being designed to execute or to be used in the execution of the method in question.

4. PRESENTATION OF THE FIGURES

Other advantages and features of the invention will become more clearly apparent from reading the following description of a particular embodiment of the invention, given by way of simple illustrative and non-limiting example, and the appended drawings, in which.

5. DETAILED DESCRIPTION OF AT LEAST ONE EMBODIMENT OF THE INVENTION

Figure 1:
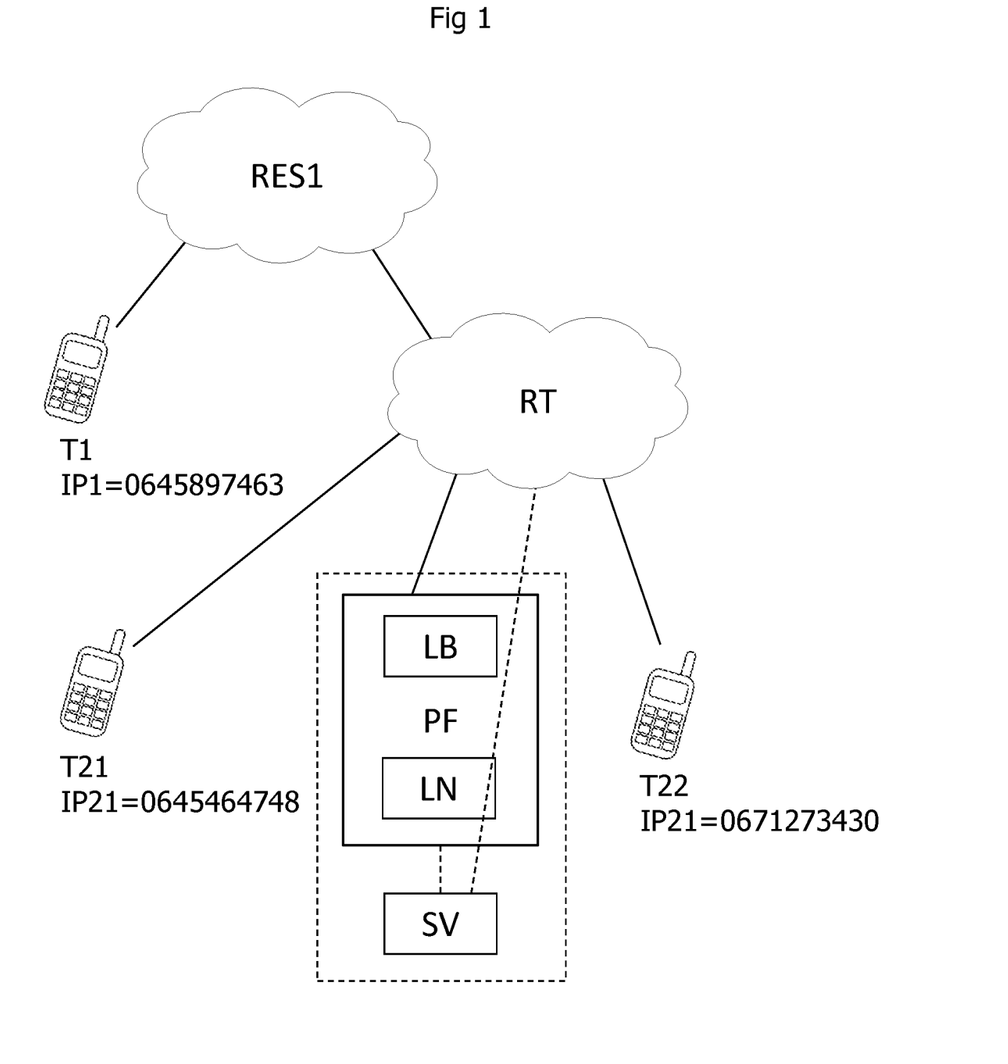
FIG. 1 schematically shows user terminals connected to a redirection platform implementing the methods for redirecting and for qualifying a communication request according to the invention.

With reference to FIG. 1, a communication network RT of a telecommunications operator and a terminal equipment T1 capable of being connected to said network are considered. In the example presented, the terminal T1 is a mobile telephone, for example a smartphone. The terminal T1 has a SIM card associated with a unique subscriber identifier IMSI which allows it to be identified in a connected or access network RES1 for which its user, who will be called Alice hereinafter, has taken out a subscription with the operator of this network. This may be a cellular network for example of GSM ("Global System for Mobile Communications") or UMTS ("Universal Mobile Telecommunications System"), LTE ("Long Term Evolution") type, or one in accordance with a later generation of the 3GPP ("3rd Generation Partnership Project") standard.

The identifier IP1 corresponds to the telephone number for reaching the user of the terminal T1. In the example of FIG. 1, IP1 corresponds to the mobile number 0645897463.

Of course, the invention is not limited to this particular example. Alice's terminal T1 may also be fixed and connected to a private network, which is itself connected by a private automatic branch exchange PABX to the telephone network RT, or else be connected to an ADSL or FTTH ("fiber to the home") network.

The identifier IP21 corresponds to the telephone number for reaching the user of the terminal T21. In the example of FIG. 1, IP21 corresponds to the mobile number 0645464748. Bob's terminal T21 may be connected to the same network as Alice's, to the network RT, or to any other network. In the example of FIG. 1, the terminal T21 is connected to network RT. The terminals T1 and T21 could equally be connected to the same network RES1, or RT.

It is assumed that Alice wishes to call the telephone number IP21.

It is assumed that Bob has subscribed, for this number IP21, to a call redirection service, which allows him to configure, in advance, one or more lists of authorized and/or blocked caller numbers. The white list LB is a list of caller numbers authorized by Bob, and the black list LN is a list of caller numbers blocked by Bob.

In what follows, a platform PF for managing such a service is considered. This platform is connected to the telecommunications network RT. If this platform PF is in an equipment that is distinct from the called terminal T21, it has an identifier or service number IPPF and creates the interface between the users of the redirection service and the telecommunications network RT. Such a platform, typically managed by the operator of the network RT, is arranged to manage the call establishment requests received by the terminals of users like Bob. When Bob subscribes to the service, the network RT is configured to perform a first redirection to the platform PF of all of the communication requests sent to Bob's terminal T21. In the case where the platform PF is installed in the terminal T21, the network RT does not need to be preconfigured in order to carry out the redirection.

The cases in which Alice's number IP1 is present on the white list LB or on the black list LN are known and will not be described in greater detail.

The case which is elaborated upon below is that in which Alice's number IP1 is absent from either, white or black, list. In this case, the communication request from Alice's terminal T1 undergoes a second redirection, to a terminal chosen in advance by Bob, distinct from Bob's terminal T21.

In a first embodiment, this redirection terminal is a user terminal T22 such as a telephone.

In a second embodiment, this redirection terminal is a voice server SV, such as a messaging server, which may or may not be interactive.

The redirection terminal T22 may be another terminal belonging to Bob, or a terminal belonging to a third party trusted by Bob and/or to whom Bob has given authorization to at least partly manage the reception of his calls. The identifier IP22 corresponds to the telephone number for reaching the user of the terminal T22. In the example of FIG. 1, IP22 corresponds to the mobile number 0671273430 and the terminal T22 is connected to the network RT, but it could equally be connected to another network such as the network RES1.

In the second embodiment, the redirection terminal is not the terminal T22 (it is the server SV which is the redirection terminal), but this terminal T22 may be chosen by Bob to receive a notification message from the platform PF, the purpose of which is to signal the reception of an unknown call by the server SV. What is meant by an unknown call is that the caller terminal number is not on the white list or on the black list, which is the case for the call from Alice in the present two embodiments.

The server SV may be distinct from the platform PF and be connected separately to the network RT, or it may be integrated with the platform PF as one of the functionalities of the platform PF.

Figure 2:
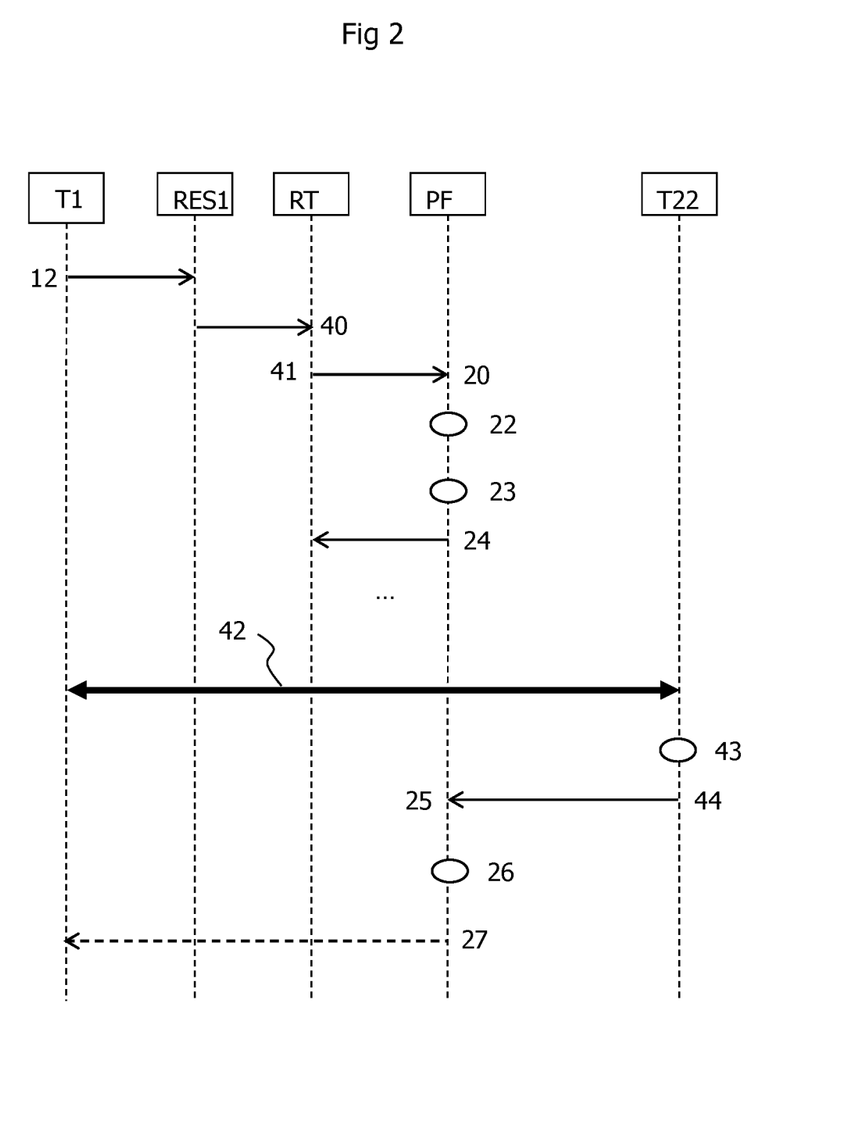
FIG. 2 illustrates a first exemplary stream of messages exchanged between the terminals, a communication network and the redirection platform according to a first embodiment of the invention.

With reference to FIG. 2, the messages exchanged between Alice's terminal T1, the telecommunications network RT, the platform PF and the redirection terminal T22 are now described, according to a first embodiment of the invention.

At 12, the first terminal T1 sends the telecommunications network RT, via the network RES1, a request to establish a communication, or communication request, with a terminal identified by the number IP21. Typically, this is a conventional circuit-switched signalling or PSTN ("public switched telephone network") message. This message comprises, as the caller number, Alice's identifier IP1, and, as the called number, the identifier IP21, which happens to be that of Bob's terminal T21. Such a SIP message is for example:

INVITE
From=IP1
To=IP21
PAI=IP1

If the platform PF is integrated with the terminal T21, it is this request which is received in 20.

If the platform PF is an equipment that is distinct from the terminal T21 and that is addressable in the network RT using an identifier IPPF, and if the network RT has been preconfigured for that purpose, upon receiving this request in 40, the telecommunications network RT identifies that the call to be established involves a programmed redirection to the platform PF, which triggers, in 41, the transmission, to the platform PF, of a message for creating a voice session of SIP INVITE type, comprising, as the called number, the identifier IPPF of the platform PF, with Alice's identifier IP1 as the caller number and Bob's identifier IP21 as the transfer number. Such a SIP message is for example:

INVITE
From=IP1
To=IPPF
PAI=IP1
Diversion=IP21

Upon receiving one or the other of these messages in 20 (according to the case), the platform PF extracts the identifier IP21 therefrom, and obtains one or more lists associated with the identifier IP21.

For example, these are a "white" list LB and a "black" list LN, comprising identifiers of terminals that are authorized or not authorized, respectively, to establish a communication session with the terminal T21.

In other applications of the invention, only one of these two lists may be implemented for the identifier IP21.

The platform PF triggers, in 22, the checking for the presence of Alice's identifier IP1 on the list LB and on the list LN. In a known manner, if this identifier is present on the list LB, the platform PF sends a command to open a session to Bob's terminal T21. Also in a known manner, if this identifier is present on the list LN, the platform PF rejects the communication request from Alice's terminal T1. These two cases are not illustrated.

The case in which Alice's identifier IP1 is not present on either of the lists, LB and LN, is the one currently of interest. In this case, the Alice's call is neither transferred to Bob nor rejected. Specifically, the platform PF determines, in 23, whether a redirection terminal T22 has been previously associated with Bob's terminal T21 in order to redirect any communication request from an unknown identifier, i.e. one present neither on the list LB nor on the list LN, thereto.

At 24, the platform PF sends a command to open a call session to the redirection terminal T22, associated with Bob's terminal T21, via a second communication channel connecting the terminal T22 to the network RT, said command comprising a called party identifier IP22 corresponding to the terminal T22 and a caller identifier IP1 corresponding to the identifier of Alice's terminal T1. To do this, it sends an INVITE-type SIP message to the telecommunications network RT. Such a SIP message is for example:

INVITE
From=IP1
To=IP22
PAI=IP1

It is assumed that the user of the terminal T22 picks up and that the communication session with the terminal T1 is established. The steps following step 24, leading to the establishment 42 of the communication session between the terminals T1 and T22, are known and do not need to be described or illustrated. Optionally, the terminal T22 obtains the identifier IP21 of the terminal T21, either in the SIP message or separately in another message such as for example an HTTP message (not illustrated) sent by the platform PF to the terminal T22. This makes it possible to indicate to the terminal T22 for which terminal the qualification of the communication session with the terminal T1 has to be carried out. Thus, the user of the terminal T22 does not have to specify it manually.

The identifier IP22 of the redirection terminal T22 is never visible to nor retrievable by the caller terminal T1, whether during redirection step 24 or during the session 42 when it is established.

The user of the terminal T22, who may be Bob or another person authorized by Bob, at the end of the communication session or during same, qualifies the session, that is to say decides, in 43, whether the call from Alice to Bob's terminal T21 should have been authorized or blocked.

The terminal T22 inserts, into an instruction message, information representative of this decision, in the context of an interaction between the user of the terminal T22 and the human-machine interface thereof. For example, such an instruction message is an HTTP POST request of the type "add IP1 to LB" or "add IP1 to LN", sent by the software application of the terminal T22 which is dedicated to the implementation of the redirection service. Such an application is configured to exchange, with the platform PF, the messages necessary for implementing the redirection service. The instruction message is sent, in 44, by this application and comprises information obtained during the interaction between the terminal T22 and the user thereof through the human-machine interface. So that the right list to be updated is identifiable from among all of the lists managed by the platform PF for all of the users thereof, the instruction message also comprises the identifier IP21 of Bob's terminal in addition to Alice's identifier IP1, and of one of the two indications LB or LN. Additionally, the instruction message may also comprise information allowing the platform PF to authenticate the terminal T22, in order to prevent an unauthorized terminal from being able to modify the white or black lists of the terminal T21.

In a step 25, the platform PF receives the instruction message sent by the terminal T22.

In a step 26, depending on whether the instruction message concerns the white list or the black list, the platform PF adds Alice's identifier IP1 to the list LB or to the list LN associated with the terminal T21. Thus, in a later attempt by Alice to contact Bob on his terminal T21, the call will be either authorized without delay or rejected entirely.

In an optional step 27, the platform PF sends Alice's terminal T1 a notification stating her addition to the list in question, for example by SMS. Thus, if Alice learns that she has been put on the white list, she may quickly try calling Bob's terminal T21 again, without being redirected to the redirection terminal T22 associated with the terminal T21.

Similarly, if Alice learns that she has been put on the black list, she will no longer try calling Bob's terminal T21.

Figure 3:
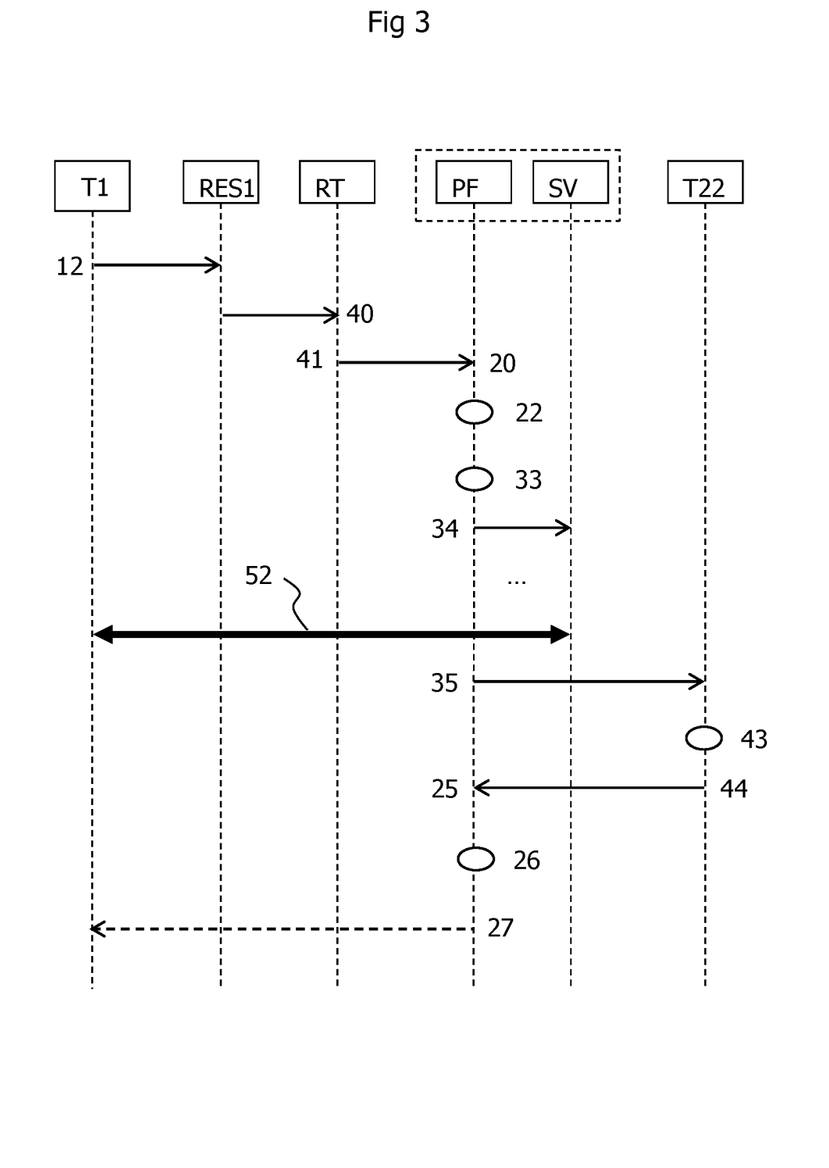
FIG. 3 illustrates a second exemplary stream of messages exchanged between the terminals, a communication network and the redirection platform according to a second embodiment of the invention.

With reference to FIG. 3, the messages exchanged between Alice's terminal T1, the telecommunications network RT, the platform PF, the server SV and the redirection terminal T22 are now described, according to a second embodiment of the invention.

This second embodiment does not differ from the first embodiment in steps 12, 40, 41, 20 and 22, which will not be described again.

After checking, in 22, whether the identifier IP1 of Alice's terminal 21 is indeed absent from the list LB or from the list LN, the platform PF determines, in 33, whether the redirection terminal which has previously been associated with Bob's terminal T21 is the voice server SV, and not a user terminal. Any communication request from an unknown identifier, i.e. one present neither on the list LB nor on the list LN, is therefore redirected to the server SV. In addition, the platform PF also determines, in 33, whether another terminal is associated with Bob's terminal T21, in this example the terminal T22, so that this associated terminal T22, and not the terminal T21, may receive a notification message relating to the redirection of the call from Alice.

In 34, the platform PF therefore sends a command to open a call session to the voice server SF. This may be carried out directly if the server SV is connected to the same network as the platform PF, such as illustrated in the figure, or via a second communication channel connecting the server SV to the network RT. Said command comprises a called party identifier IPSV corresponding to the server SV, and the caller identifier IP1 corresponding to the identifier of Alice's terminal T1. To do this, it sends an INVITE-type SIP message. Such a SIP message is for example:

INVITE
From=IP1
To=IPSV
Diversion=IP21

The steps following step 34, leading to the establishment 52 of the communication session between the terminal T1 and the voice server SV, are known and do not need to be described or illustrated.

In one, preferred variant of the method, the establishment step 52 triggers the sending, in 35, of a notification message by the platform PF to the terminal T22 associated with the terminal T21. The notification message is received on the terminal T22 for example by the software application of the terminal T22 which is dedicated to the implementation of the redirection service.

The notification message may comprise information allowing the user of the terminal T22 to take a decision on whether or not to add the identifier IP1 to a white or black list specific to the terminal T21. For example, the notification message is an HTTP POST request of the type "unknown call from IP1 for T21". The notification message may be enriched with a voice message left by Alice, or a text transcript created from the message vocal, or information obtained by the server SV following an interactive exchange between the server SV and Alice's terminal T1. In this case, the server sends a similar notification to the platform PF beforehand (not illustrated).

Alternatively, the notification message may comprise only an item of information indicating that a message from an unknown terminal has been left for the terminal T21 on the server SV. In this case, the terminal T22 takes the initiative, at a later time chosen by its user, to consult the server SV which acts as a remotely consultable conventional voicemail.

In another variant, not illustrated, there is no step 35, and the terminal T22 does not receive a notification message but takes the initiative, at a time chosen by its user, to consult the server SV which acts as a remotely consultable conventional voicemail, but without knowing for sure that a message has been left there.

Once they are aware of the necessary information, the user of the terminal T22, who may be Bob or another person authorized by Bob, decides whether the call from Alice to Bob should have been authorized or blocked in a step 43 identical to the first embodiment. The following steps, 44, 25, 26 et 27, are identical to those of the first embodiment presented with reference to FIG. 2 and will not be described again.

Figure 4:
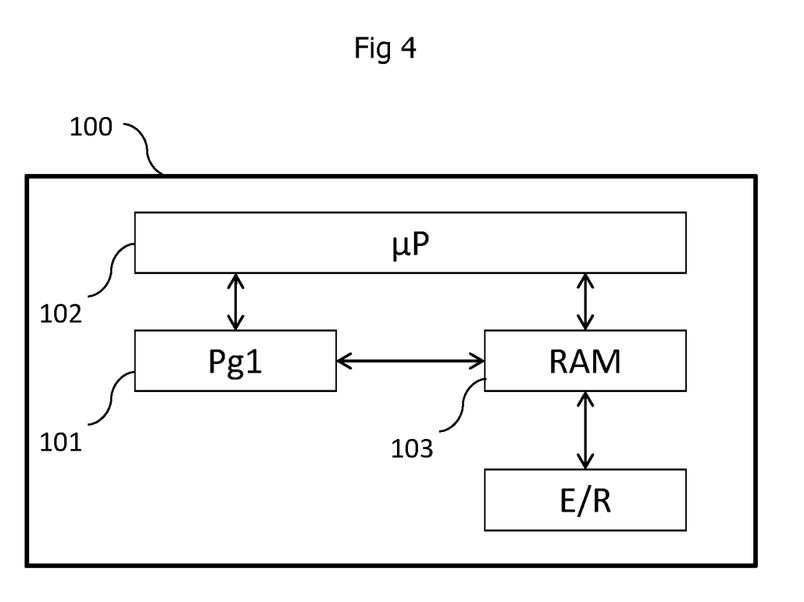
FIG. 4 schematically shows an exemplary hardware structure of a device for redirecting a communication request according to the invention.

With reference to FIG. 4, what is presented now is the hardware structure of a device 100 for redirecting a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the device comprising a receiver, a transmitter, a processor and a memory coupled to the processor with instructions intended to be executed by the processor for:

redirecting the communication request to a terminal associated with the called terminal, distinct from the called terminal, referred to as the redirection terminal, receiving an instruction message, comprising the identifier of the caller terminal and an instruction relating to the white list or to the black list, depending on the instruction received, adding the identifier of the caller terminal to the white list or to the black list.

More generally, such a device 100 comprises a random-access memory 103 (for example a RAM), a processing unit 102 equipped for example with a processor and driven by a computer program Pg1 representative of a module for redirecting the communication request to a terminal associated with the called terminal, distinct from the called terminal, referred to as the redirection terminal, representative of a module for receiving an instruction message, comprising the identifier of the caller terminal and an instruction relating to the white list or to the black list, representative of a module for adding, depending on the instruction received, the identifier of the caller terminal to the white list or to the black list, the program being stored in a read-only memory 101 (for example a ROM or a hard disk).

Advantageously, the computer program Pg1 is also representative of a module for sending a notification message to another terminal associated with the called terminal, referred to as the associated terminal, distinct both from the called terminal and from the redirection terminal, the notification message comprising at least one item of information relating to the redirection, representative of a module for receiving an identifier of the associated terminal, and representative of a module for sending, to the caller terminal, a notification relating to the addition of the identifier of the caller terminal to the white list or to the black list.

On initialization, the code instructions of the computer program are for example loaded into the random access memory 103, before being executed by the processor of the processing unit 102. The random-access memory 103 contains for example the values of identifiers of terminals on the white list and on the black list.

FIG. 4 illustrates only one particular way, out of several possibilities, of producing the redirection device 100 so that it carries out the steps of the redirection method as described above with reference to FIGS. 1 to 3 in its different embodiments. Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

If the device 100 is formed with a reprogrammable computing machine, the corresponding program (that is to say the sequence of instructions) may be stored in a removable storage medium (such as for example a USB stick, floppy disk, a CD-ROM or a DVD-ROM) or a non-removable storage medium, this storage medium being able to be read partly or fully by a computer or a processor.

The different embodiments have been described above with reference to a device 100 which may either be integrated with a redirection platform PF of the communication network RT or more generally in any server equipment of this network, or be integrated with a user terminal in the form of a mobile application installed in the called terminal.

Figure 5:
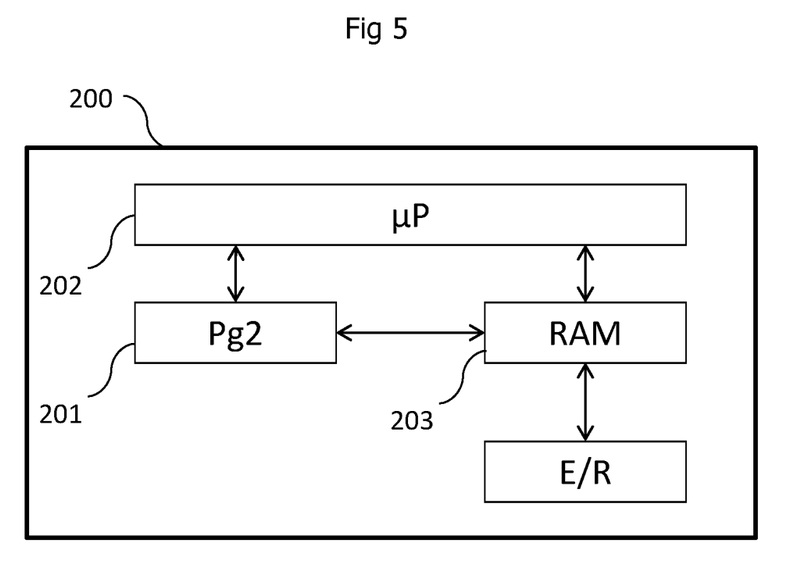
FIG. 5 schematically shows an exemplary hardware structure of a device for qualifying a communication request according to the invention.

With reference to FIG. 5, what is presented now is the hardware structure of a device 200 for qualifying a communication request sent by a terminal referred to as the caller terminal to a terminal referred to as the called terminal, an identifier of the caller terminal being absent from a list of identifiers of caller terminals for which the establishment of a communication with the called terminal is authorized or blocked, referred to as a white list or black list, respectively, the device comprising a receiver, a transmitter, a processor and a memory coupled to the processor with instructions intended to be executed by the processor for:
  establishing the communication request between the caller terminal and a user terminal, distinct from the called terminal, referred to as the redirection terminal, after redirecting the request to the redirection terminal,
  sending an instruction message comprising the identifier of the caller terminal and an instruction relating to the white list or to the black list.

More generally, such a device 200 comprises a random-access memory 203 (for example a RAM), a processing unit 202 equipped for example with a processor and driven by a computer program Pg2 representative of a module for qualifying the communication request to a terminal associated with the called terminal, distinct from the called terminal, referred to as the redirection terminal, representative of a module for sending an instruction message, comprising the identifier of the caller terminal and an instruction relating to the white list or to the black list, the program being stored in a read-only memory 201 (for example a ROM or a hard disk).

Advantageously, the computer program Pg2 is also representative of a module for obtaining an identifier of the called terminal.

On initialization, the code instructions of the computer program are for example loaded into the random access memory 203, before being executed by the processor of the processing unit 202.

FIG. 5 illustrates only one particular way, out of several possibilities, of producing the qualification device 200 so that it carries out the steps of the qualification method as described above with reference to FIGS. 1 to 3 in its different embodiments. Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

If the device 200 is formed with a reprogrammable computing machine, the corresponding program (that is to say the sequence of instructions) may be stored in a removable storage medium (such as for example a USB stick, floppy disk, a CD-ROM or a DVD-ROM) or a non-removable storage medium, this storage medium being able to be read partly or fully by a computer or a processor.

The different embodiments have been described above with reference to a device 200 which may be integrated with a user terminal in the form of a mobile application installed in the redirection terminal.

The functions described above, performed by the redirection device or by the qualification device, may be distributed over a plurality of equipment or over a plurality of modules of one and the same equipment, comprising for example a first equipment (or module) forming the interface with users and a second equipment (or module) forming the interface with the telecommunications network, the first equipment (or module) and the second equipment (or module) being arranged to communicate with one another via a dedicated interface.

The term "module" may correspond equally to a software component or to a hardware component or to a set of software and hardware components, a software component itself corresponding to one or more computer programs or subroutines or, more generally, to any element of a program able to implement a function or a set of functions. The modules for sending and/or receiving are schematically represented in the figure by a module E/R but may be separate.

The invention described above in its different embodiments, by virtue of the redirection method and device, makes it possible to effectively manage a white or black list associated with a terminal without the user of this terminal being called upon at any time, directly on their terminal. In addition, the invention provides two effects which, until now, are rarely obtained together, namely that all solicited calls may be received on the terminal and that no unsolicited calls are received on this same terminal.

The invention claimed is:

1. A method implemented by a redirection platform and comprising:
  receiving a communication request sent by a caller terminal to a called terminal, an identifier of the caller terminal being absent from a list of identifiers of caller terminals for which establishment of a communication with the called terminal is authorized or blocked, referred to as a white list or black list, respectively;
  redirecting the communication request to a user terminal, chosen in advance by a user of the called terminal and distinct from the called terminal, referred to as a redirection terminal, wherein the redirection platform is implemented on a device of a telecommunication network that is distinct from the redirection terminal, and the redirection terminal comprises a human-machine interface;
  receiving, from the redirection terminal, an instruction message, comprising an identifier of the caller terminal and an instruction relating to the white list or to the black list, obtained through an interaction with the human-machine interface of the redirection terminal, in order to authorize or block the caller terminal; and
  depending on the instruction received, adding the identifier of the caller terminal to the white list or to the black list.

2. The method according to claim 1, further comprising selecting the redirection terminal from a group of redirection terminals according to predetermined criteria.

3. The method according to claim 1, comprising, prior to the redirecting, obtaining the identifier of the redirection terminal.

4. The method according to claim 1, where the redirection terminal is a terminal of a third party appointed by the user of the called terminal.

5. The method according to claim 1, comprising sending, to the caller terminal, a notification relating to the addition, to the white list or to the black list, of the identifier of the caller terminal.

6. A method comprising:
  qualifying a communication request sent by a caller terminal to a called terminal, an identifier of the caller terminal being absent from a list of identifiers of caller terminals for which establishment of a communication with the called terminal is authorized or blocked, referred to as a white list or black list, respectively, the qualifying being performed by a user terminal, which is referred to as a redirection terminal, is chosen in advance by a user of the called terminal and is distinct from the called terminal, and the qualifying comprising:

establishing a communication between the caller terminal and the redirection terminal, after the request is redirected by a redirection platform to the redirection terminal, wherein the redirection platform is implemented on a device of a telecommunication network that is distinct from the redirection terminal;

obtaining through a human-machine interface of the redirection terminal an instruction for entering the calling terminal into to the white list or to the black list; and sending an instruction message to the redirection platform comprising the identifier of the caller terminal and the instruction relating to the white list or to the black list.

7. The method according to claim 6, further comprising obtaining an identifier of the called terminal.

8. A non-transitory computer-readable medium comprising instructions of a computer program stored thereon which when executed by a processor of a redirection platform configure the redirection platform to:

receive a communication request sent by a caller terminal to a called terminal, an identifier of the caller terminal being absent from a list of identifiers of caller terminals for which establishment of a communication with the called terminal is authorized or blocked, referred to as a white list or black list, respectively;

redirect the communication request to a user terminal, which is referred to as a redirection terminal, is chosen in advance by a user of the called terminal, and is distinct from the called terminal, wherein the redirection platform is implemented on a device of a telecommunication network that is distinct from the redirection terminal, and the redirection terminal comprises a human-machine interface;

receive, from the redirection terminal, an instruction message comprising an identifier of the caller terminal and an instruction relating to the white list or to the black list, obtained through an interaction with the human-machine interface of the redirection terminal, in order to authorize or block the caller terminal; and depending on the instruction received, add the identifier of the caller terminal to the white list or to the black list.

9. A non-transitory computer-readable medium comprising instructions of a computer program stored thereon which when executed by a processor of a user terminal, which is referred to as a redirection terminal, configure the redirection terminal to:

qualify a communication request sent by a caller terminal to a called terminal, an identifier of the caller terminal being absent from a list of identifiers of caller terminals for which establishment of a communication with the called terminal is authorized or blocked, referred to as a white list or black list, respectively, wherein the redirection terminal is chosen in advance by a user of the called terminal and is distinct from the called terminal, and wherein the redirection terminal qualifies the communication request by:

establishing a communication between the caller terminal and the redirection terminal, after the request is redirected by a redirection platform to the redirection terminal, wherein the redirection platform is implemented on a device of a telecommunication network that is distinct from the redirection terminal;

obtaining through a human-machine interface of the redirection terminal an instruction for entering the calling terminal into to the white list or to the black list; and sending an instruction message to the redirection platform comprising the identifier of the caller terminal and the instruction relating to the white list or to the black list.

* * * * *